United States Patent
Watanabe

(10) Patent No.: US 6,757,331 B2
(45) Date of Patent: Jun. 29, 2004

(54) INFORMATION INSERTION/DETECTION SYSTEM

(75) Inventor: Junya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 412 days.

(21) Appl. No.: 09/750,519

(22) Filed: Dec. 28, 2000

(65) Prior Publication Data

US 2001/0005397 A1 Jun. 28, 2001

(30) Foreign Application Priority Data

Dec. 28, 1999 (JP) .......................................... 11-374919

(51) Int. Cl.$^7$ ................................................ H04N 7/18
(52) U.S. Cl. ................................ 375/240.2; 375/240.21
(58) Field of Search ......................... 375/240.2–240.29

(56) References Cited

U.S. PATENT DOCUMENTS

| | | | |
|---|---|---|---|
| 6,188,728 B1 * | 2/2001 | Hurst | 375/240.16 |
| 6,208,745 B1 * | 3/2001 | Florencio et al. | 382/100 |
| 6,285,775 B1 * | 9/2001 | Wu et al. | 382/100 |

FOREIGN PATENT DOCUMENTS

| JP | 10-304176 | 11/1998 |
|---|---|---|
| JP | 11-69133 | 3/1999 |
| JP | 11-268352 | 10/1999 |
| JP | 11-346302 | 12/1999 |

OTHER PUBLICATIONS

Copy of Japanese Office Action dated Oct. 20, 2003 (and English translation of relevant portion).

* cited by examiner

*Primary Examiner*—Andy Rao
(74) *Attorney, Agent, or Firm*—Dickstein, Shapiro, Morin & Oshinsky, LLP.

(57) ABSTRACT

An information insertion/detection system for detecting and inserting DCT coefficients in image signals includes a resolution analyzer for receiving image code data and outputting the image code data and image size information of the image code data, an insertion pattern determining unit for receiving the image code data and the image size information and outputting the image code data and pattern information, an information inserter for receiving the image code data and the pattern information and producing image code data by inserting information of the DCT coefficients into the image code data and a video analyzer for receiving the image code data and producing information of insertion strength of the DCT coefficients. The information is inserted in DCT coefficients so that the information can be detected by referring to an image size of MPEG data inputted to the system when the image data is converted into a reference image size.

8 Claims, 4 Drawing Sheets

F I G. 2

| Pat A | Pat E | Pat C | Pat C | Pat F | Pat B | Pat A |
|---|---|---|---|---|---|---|

INSERTION PATTERN OF REFERENCE VIDEO BLOCK

| Pat A | Pat E | Pat C | Pat F | Pat B |
|---|---|---|---|---|

INSERTION PATTERN OF SMALL IMAGE

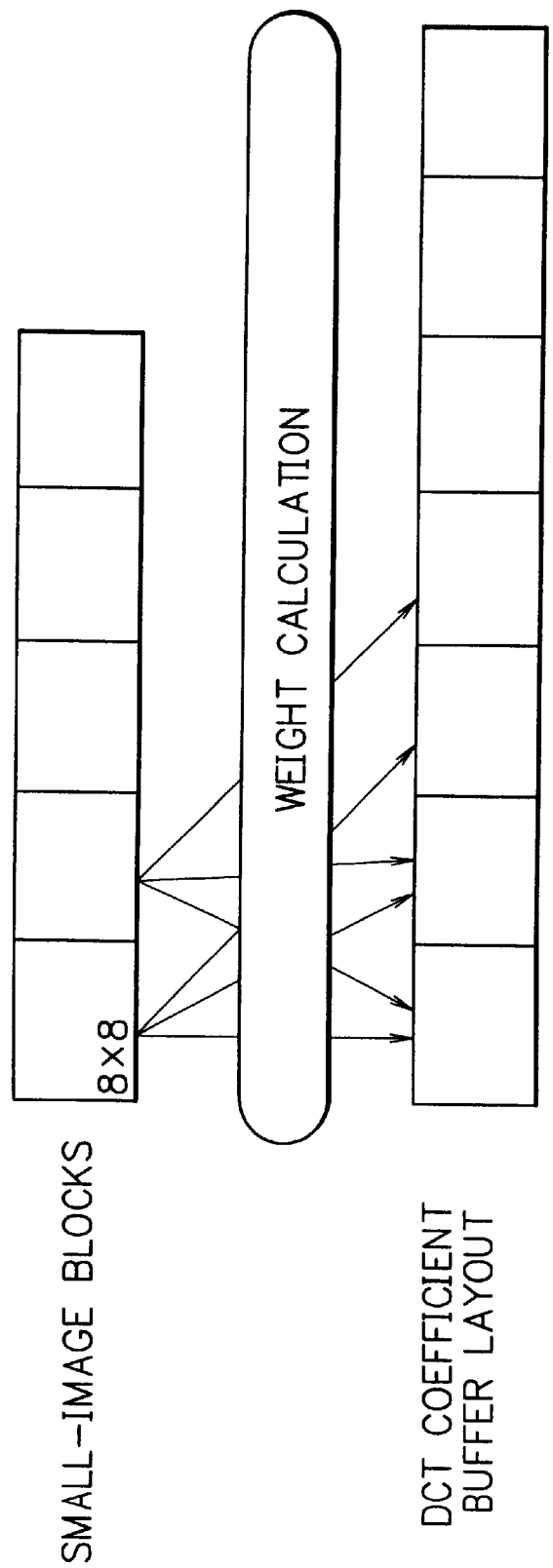

INFORMATION INSERTION/DETECTION SYSTEM

BACKGROUND OF THE INVENTION

The present invention relates to an information insertion/detection system for discrete cosine transform (DCT) coefficients coping with resolution conversion, and in particular, to an information insertion/detection system for discrete cosine transform (DCT) coefficients associated with an image size of video signals.

PRIOR ART

To compress an image and/or voice, the discrete cosine transform has been recently adopted. In the technique, signals are encoded through an orthogonal transform process as an efficient encoding operation into signals of respective coefficients. Coefficients which resultantly have no correlation therebetween are encoded. In general, for example, Fourier transform, Hadamard transform, or K-L transform is known for the transforming technique. However, thanks to improvement of processing performance of devices due to recent development of the device technique, an efficient discrete cosine transform has been primarily utilized. Also in moving picture expert group (MPEG) 1, MPEG 2, MPEG 4, and MPEG 7 employing a DCT operation for image or video signals and for voice or audio signals, the conversion technique has been employed in a hybrid system in combination with a forecasting device.

In the MPEG image compression/expansion encoding method of the prior art, an original image is subdivided into blocks each of which including data of 8 pixels by 8 pixels. A DCT operation is conducted for the blocks to produce direct-current (dc) signal components and alternating-current (ac) signal components. The dc and ac components are alternately outputted to a quantizing unit in an ascending order of frequency, namely, beginning from a lower-frequency component to high frequency component. The quantizing unit quantizes the received signal components utilizing a predetermined luminance signal quantization table and a predetermined color difference signal quantization table. Signals resultant from the quantization are transmitted therefrom as DCT coefficients. In MPEG1 technique, bit streams of the quantized signals are sent through a sequence layer of a group of picture (GOP) layer, a picture layer, a slice layer, a macro block layer, and a block layer. The DCT coefficients after the DCT operation are fed to the block layer in the form of quantized numeric values. The quantized values are represented according to a run level of a first DCT coefficient thereof, a variable-length code of the level, and a difference between the first DCT coefficient and a DCT coefficient subsequent thereto.

MPEG2, same as in MPEG1, are six layers ranging from the sequence layer to the block layer. MPEG2 uses a bit stream similar to that of MPG1. However, when a sequence extension field appears subsequently a sequence header, the signals are determined as MPEG2 signals. In the block layer, SDC (Subsequent DCT Coefficients) signals are sent in a bit stream including a DCT DC size luminance—DCT DC differential (DDSL-DDD) field, a DCT DC size chrominance—DCT DC differential (DDSC-DDD) field, a first DCT coefficient (FDC) field, a subsequent DCT coefficients (field), and an end of block (EOB) field. The DCT coefficients are quantized as follows. DCT coefficients are scanned in the block layer according to dc components thereof in an alternating manner in the block layer. The DCT coefficients are then quantized using a quantization table to obtain differences therebetween. The differences are transmitted in the form of a quantity of data.

However, in the DCT information insertion step, information is inserted into each MPEG block. Therefore, when a picture or an image is expanded or minimized after the insertion of DCT coefficients, there possibly occurs a case in which the information of DCT coefficients cannot be detected. In the expansion or compression of video signals, when the transmission capacity of a communication line is insufficient, for example, in a case of radio transmission, the picture signals are compressed before transmission depending on cases.

In this situation, the video signals are compressed after insertion of information in DCT coefficients. Consequently, the information of DCT coefficients cannot be easily detected in the information of DCT signals inserted into the video signals sent via radio transmission. Moreover, when the video signals are expanded or compressed through an illegal action, it is impossible to detect information of the DCT coefficients. Consequently, a considerable need exists for an information inserter and an information detector for the DCT coefficients coping with signal expansion and compression.

SUMMARY OF THE INVENTION

It is therefore an object of the present invention to provide an information insertion/detection system in which even when a video signal with DCT coefficients inserted therein is expanded and/or compressed, the DCT coefficients can be correctly restored to be inserted in a video signal.

To achieve the object above in accordance with the present invention, there is provided a system in which information is inserted in DCT coefficients so that the information can be detected by referring to an image size of MPEG data inputted to the system when the image data is converted into a reference image size. In the detection of the information in the DCT coefficients, an information detector of the information of DCT coefficients refers to a picture size of MPEG data to be detected and carries out processing equivalent to the method of reference picture size conversion described above. An information inserter and an information detector for the information of CDT coefficients conduct processing according to an equal reference picture size. Therefore, the information of DCT coefficients can be detected regardless of the image size in the insertion of information in the DCT coefficients and independent of conversion of resolution after the insertion.

In accordance with the present invention, there is provided an information insertion/detection system for detecting and inserting DCT coefficients in image signals. The system includes a resolution analyzer for receiving image code data and outputting the image code data and information of size of an image of the image code data, an insertion pattern determining unit for receiving the image code data and the image size information and outputting the image code data and pattern information, an information inserter for receiving the image code data and the pattern information and producing image code data by inserting information of the DCT coefficients into the image code data, and a video analyzer for receiving the image code data and producing information of insertion strength of the DCT coefficients.

In accordance with the present invention, there is provided an information insertion/detection system for detecting and inserting DCT coefficients in image signals. The system includes a resolution analyzer for receiving image code data of the image signals and outputting the image code data and image size information of the image code data, a block expander for receiving the image code data and the image size information and outputting DCT coefficients of the image code data and the image code data, a DCT coefficient buffer for receiving the DCT coefficients and outputting, when one frame of DCT coefficients is accumulated, an information detection start signal of the DCT coefficients accumulated therein, and a DCT coefficient information detector for detecting information in the DCT coefficients in response to the information detection start signal and outputting a result of the detection.

Conceptually, the system can detect, even after the insertion of information into DCT coefficients, the information inserted into DCT coefficients. In the prior art, when video resolution is converted or changed after the insertion of information into DCT coefficients, it is difficult to detect the inserted information. In contrast therewith, the present invention provides an information insertion/detection system for DCT coefficients coping with picture expansion and minimization only by slightly modifying the information inserter and the information detector for information of DCT coefficients.

BRIEF DESCRIPTION OF THE DRAWINGS

The objects and features of the present invention will become more apparent from the consideration of the following detailed description taken in conjunction with the accompanying drawings in which:

FIG. 2 is a diagram for explaining an example of operation of an insertion pattern generator in accordance with the present invention;

FIG. 4 is a diagram for explaining an example of operation of a block expander in accordance with the present invention.

DESCRIPTION OF THE PREFERRED EMBODIMENTS

Referring next to the accompanying drawings, description will be given in detail of an embodiment of an information insertion/detection system in accordance with the present invention.

Configuration of the Embodiment

Figure 1:
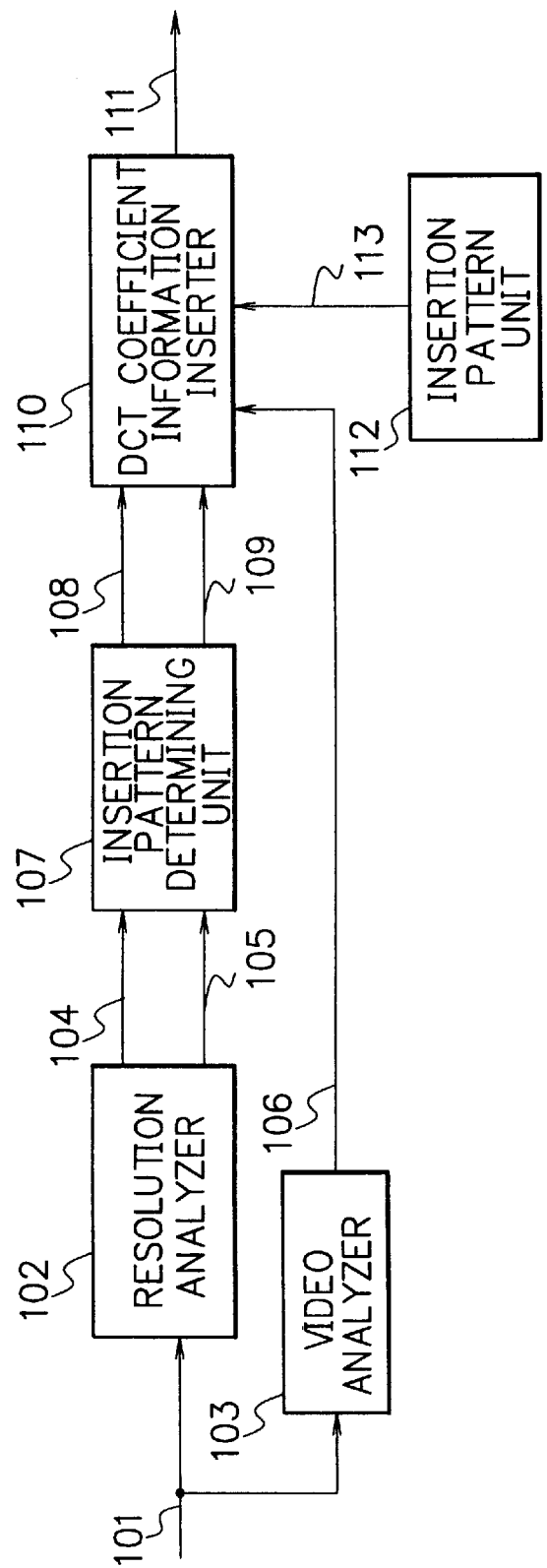
FIG. 1 is a schematic block diagram showing a configuration of an information inserter for DCT coefficients coping with resolution conversion in accordance with the present invention.

Referring to the accompanying drawings, description will be given in detail of constitution of an embodiment of an information insertion/detection system in accordance with the present invention. FIG. 1 schematically shows an information inserter for DCT coefficient coping with conversion of resolution. The configuration of FIG. 1 includes a resolution analyzer 102 which receives MPEG data of video code data from an input line 101 to output MPEG data to a line 104 and information to a line 105, an insertion pattern determining unit 107 which receives signals from the lines 104 and 105 to output MPEG data to a line 108 and information to line 109, an information inserter 110 which receives signals from lines 108, 109, 106 and 113 to output to an output line 111 MPEG data in which information is inserted into DCT coefficients, a video analyzer 103 which receives MPEG data from the input line 101 to output information to the line 106, and an insertion pattern unit 112 to output a vide pattern to the line 113.

Figure 3:
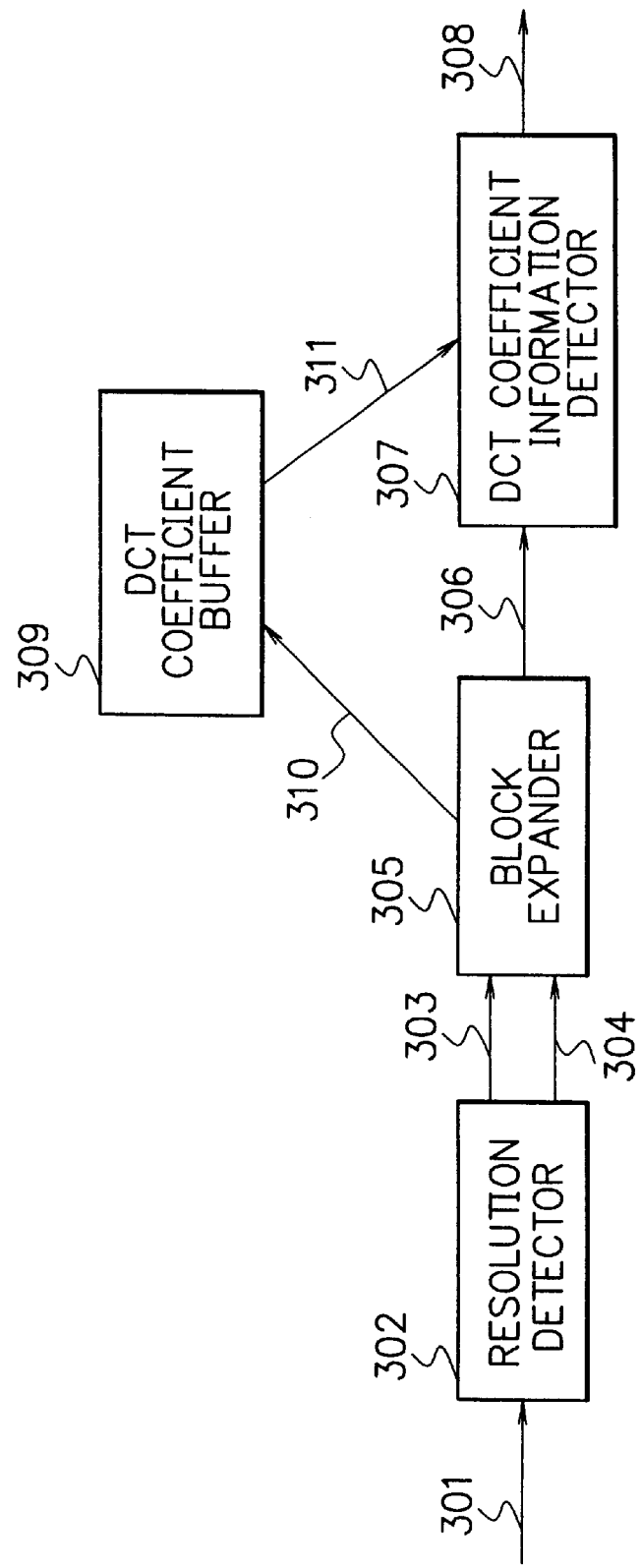
FIG. 3 is a block diagram illustratively showing a configuration of a information detector for DCT coefficients coping with resolution conversion in accordance with the present invention.

FIG. 3 illustratively shows an information detector for DCT coefficients coping with conversion of resolution. The system of FIG. 3 includes a resolution detector 302 which receives MPEG data from an input line 301 to output MPEG data to a line 303 and information to line 304, a block expander 305 which receives signals from the lines 303 and 304 to expand or to compress information of video signals in 8 (bytes) by 8 (bytes) blocks and which outputs DCT coefficients via a line 310 to a DCT coefficient buffer 309 and a signal to a line 306, and an information detector 307 which receives a signal delivered via the line 306 from the block expander 305 and DCT coefficients from line 311 to output a result of detection to a line 308. In the MPEG system, the DCT is conducted in the unit of 8 (bytes) by 8 (bytes). When a picture is minimized, information inserted into blocks in the insertion of information into DCT coefficients is deformed. However, even after the insertion, the DCT coefficient information detector 307 must execute processing in the unit of 8 (bytes) by 8 (bytes). Otherwise, calculation steps are increased. By approximating the deformed block to one of information items (patterns) inserted in the DCT information insertion, the information inserted in the DCT coefficients can be detected even in an minimized picture.

The block expander 305 determines a pattern for which appropriate similarity is attained between the pattern and that of minimized image. The DCT coefficient buffer 309 stores therein one screen of video information (DCT coefficients). The DCT coefficient information detector detects inserted information using the DCT coefficients for one screen.

The input pattern unit 112 includes in general an input pattern 112 containing values in blocks in the unit of 8 (bytes) by 8 (bytes).

Operation of the Embodiment

Description will be given of operation of the DCT coefficient information inserter/detector coping with conversion of resolution in accordance with the present invention.

FIG. 1 schematically shows constitution of the DCT coefficient information insertion/detection system in accordance with the present invention. FIG. 2 illustratively shows operation of the insertion pattern determining unit 107. FIG. 3 shows a configuration of the DCT coefficient information detector coping with conversion of resolution in accordance with the present invention. FIG. 4 shows an example of operation of the block expander.

The resolution analyzer 102 of FIG. 1 receives MPEG data from an input line 101, detects an image size of MPEG data, the size recorded in the MPEG data. The analyzer 102 then outputs information of the image size to the line 105 and sends the MPEG data received from the input line 101 directly to the line 104.

The video analyzer 103 determines, according to DCT coefficients of the MPEG data received from the input line 101, strength of insertion of information in DCT coefficients for each MPEG block and then outputs the insertion strength determined to the line 106.

The insertion pattern determining unit 107 determines, according to the image size received from the line 105, an insertion pattern to be inserted and then delivers information of the insertion pattern to the line 109. The unit 107 also outputs the MPEG data received from the line 104 directly to the line 108. For the MPEG data received from line 108, the DCT coefficient information inserter 110 inserts an insertion pattern 112 delivered from the line 113 according to the insertion pattern information fed from the line 109 into the DCT coefficients with an insertion strength received from the line 106.

FIG. 2 shows an example of operation of the insertion pattern determining unit 107. When the MPEG image data delivered from the line 104 is less than a reference image, the system determines an insertion pattern by assuming that when the MPEG data is expanded into a reference image size, there is obtained a block equal in arrangement to the reference block. When an insertion pattern is determined for each block of the MPEG data in a small image and the small image is expanded to the reference image size, the entire image is substantially equal to the insertion pattern of the reference image. Consequently, the information of DCT coefficients can be detected. Also for an image larger than the reference image, an insertion pattern is arranged such that when the image is minimized down to a reference image size, the entire image is substantially equal to the insertion pattern of the reference image.

The resolution detector 302 of FIG. 3 receives MPEG data from the input line 301 and determines an image size of the MPEG data recorded in the MPEG data. The detector 302 sends the MPEG data directly to the line 303 and delivers the MPEG data image size to the line 304.

The block expander 305 outputs, according to DCT coefficients and MPEG information of the MPEG data from the line 303, the DCT coefficients via the line 310 to a predetermined address of the DCT coefficient buffer 309 to add the DCT coefficients to associated items. When one frame of MPEG data is completely accumulated in the DCT coefficient buffer 309, the block expander 305 delivers a signal indicating that one frame of DCT coefficients is completely accumulated and detection of information in DCT coefficients is started.

On receiving a signal from the line 306, the DCT coefficient information detector 307 receives data via the line 311 from the DCT coefficient buffer 309, detects information in the DCT coefficients, and sends a result of detection to the output line 308.

FIG. 4 shows an example of operation of the block expander 305. When MPEG data received is smaller than a reference image, the block expander 305 determines addresses in the DCT coefficient buffer 309 by assuming that when the MPEG data is expanded to a reference image size, a block resultant from the expansion is the same in arrangement as the reference block. In the operation, for an image smaller than the reference image of a predetermined size, the expander 305 determines a write address for each MPEG block. Before writing the data in the buffer 309, the expander 305 weights each DCT coefficients. For an image larger than the reference image, the block expander 305 calculates addresses in the DCT coefficient buffer 309 by assuming that when the image is minimized to the reference image size, a block resultant from the minimization is almost the same in arrangement as a detection pattern of the reference block.

In accordance with the present invention, after information is inserted in DCT coefficients, even if the DCT data is expanded and/or compressed, the information inserted as digital watermark data can be detected.

In accordance with the present invention, even when an image including a digital watermark is minimized or expanded, the digital watermark can be detected by a watermark inserter/detector implemented by slightly modifying a watermark inserter/detector not coping with image expansion and minimization.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An information insertion/detection system for detecting and inserting DCT coefficients in image signals, comprising:
   a resolution analyzer for receiving image code data and outputting the image code data and information of size of an image of the image code data;
   an insertion pattern determining unit for receiving the image code data and the image size information and outputting the image code data and pattern information;
   an information inserter for receiving the image code data and the pattern information and producing image code data by inserting information of the DCT coefficients into the image code data; and
   a video analyzer for receiving the image code data and producing information of insertion strength of the DCT coefficients.

2. An information insertion/detection system for detecting and inserting DCT coefficients in image signals, comprising:
   a resolution analyzer for receiving image code data and outputting the image code data and information of size of an image of the image code data;
   an insertion pattern determining unit for receiving the image code data and the image size information and outputting the image code data and pattern information;
   an information inserter for receiving the image code data and the pattern information and producing image code data by inserting information of the DCT coefficients into the image code data; and
   a video analyzer for receiving the image code data and producing information of insertion strength of the DCT coefficients
   said image code data is MPEG data; and
   said information inserter receives the image code data and the pattern information and producing image code data by inserting information of the DCT coefficients into the image code data using the insertion strength information of the DCT coefficients.

3. The information insertion/detection system in accordance with claim 1, further comprising an insertion pattern generator for generating a plurality of image insertion patterns,
   said insertion pattern generator selecting one of the insertion patterns according to the pattern information from said insertion pattern determining unit and outputting the image code data.

4. The information insertion/detection system in accordance with claim 2, further comprising an insertion pattern generator for generating a plurality of image insertion patterns,
   said insertion pattern generator selecting one of the insertion patterns according to the pattern information from said insertion pattern determining unit and outputting the image code data.

5. An information insertion/detection system for detecting and inserting DCT coefficients in image signals, comprising:
   a resolution analyzer for receiving image code data of the image signals and outputting the image code data and image size information of the image code data;
   a block expander for receiving the image code data and the image size information and outputting DCT coefficients of the image code data and the image code data;

a DCT coefficient buffer for receiving the DCT coefficients and outputting, when one frame of DCT coefficients is accumulated, an information detection start signal of the DCT coefficients accumulated therein; and a DCT coefficient information detector for detecting information in the DCT coefficients in response to the information detection start signal and outputting a result of the detection.

6. An information insertion/detection system for detecting and inserting DCT coefficients in image signals, comprising:

a resolution analyzer for receiving image code data of the image signals and outputting the image code data and image size information of the image code data;

a block expander for receiving the image code data and the image size information and outputting DCT coefficients of the image code data and the image code data;

a DCT coefficient buffer for receiving the DCT coefficients and outputting, when one frame of DCT coefficients is accumulated, an information detection start signal of the DCT coefficients accumulated therein; and a DCT coefficient information detector for detecting information in the DCT coefficients in response to the information detection start signal and outputting a result of the detection, wherein:

said image code data is MPEG data; and said block expander outputs, when it is found that the image is smaller than a reference image according to the DCT coefficients and the image size information, the DCT coefficients to said DCT coefficient buffer by assuming that when the image code data is expanded to a reference image size, there is obtained a block which is almost the same in arrangement as a reference image block.

7. The information insertion/detection system in accordance with claim 4, wherein said block expander determines, when it is found that the image is larger than the reference image according to the DCT coefficients and the image size information, addresses in said DCT coefficient buffer by assuming that when the image code data is compressed to the reference image size, there is obtained data which is almost the same in arrangement as a detection pattern of the reference image.

8. The information insertion/detection system in accordance with claim 5, wherein said block expander determines, when it is found that the image is larger than the reference image according to the DCT coefficients and the image size information, addresses in said DCT coefficient buffer by assuming that when the image code data is compressed to the reference image size, there is obtained data which is almost the same in arrangement as a detection pattern of the reference image.

* * * * *